(12) United States Patent
Donatiello

(10) Patent No.: US 8,347,055 B2
(45) Date of Patent: Jan. 1, 2013

(54) METHOD TO DEFRAG A MEMORY OF AN IC CARD

(75) Inventor: Saverio Donatiello, Mercogliano (IT)

(73) Assignee: Incard S.A., Geneva (CH)

( * ) Notice: Subject to any disclaimer, the term of this patent is extended or adjusted under 35 U.S.C. 154(b) by 363 days.

(21) Appl. No.: 12/826,254

(22) Filed: Jun. 29, 2010

(65) Prior Publication Data

US 2010/0332752 A1    Dec. 30, 2010

(30) Foreign Application Priority Data

Jun. 30, 2009   (IT) .............................. MI2009A1162

(51) Int. Cl.
*G06F 12/00*   (2006.01)
(52) U.S. Cl. ........ 711/165; 711/104; 711/154; 711/159; 711/170
(58) Field of Classification Search .................. 711/104, 711/154, 159, 165, 170
See application file for complete search history.

(56) References Cited

U.S. PATENT DOCUMENTS

| | | | |
|---|---|---|---|
| 5,898,868 A | 4/1999 | Krueger et al. ............... 395/621 |
| 6,145,069 A * | 11/2000 | Dye ............................... 711/170 |
| 6,397,311 B1 | 5/2002 | Capps ........................... 711/165 |
| 2004/0117578 A1* | 6/2004 | Castelli et al. ................. 711/170 |
| 2006/0173939 A1 | 8/2006 | Yin et al. ....................... 707/206 |
| 2007/0016633 A1* | 1/2007 | Lindholm et al. ............. 707/206 |
| 2008/0086603 A1* | 4/2008 | Lahtinen et al. .............. 711/147 |
| 2010/0228918 A1* | 9/2010 | Vorbach et al. ............... 711/118 |
| 2011/0035557 A1* | 2/2011 | Luukkainen ................... 711/154 |
| 2011/0153972 A1* | 6/2011 | LaBerge ........................ 711/165 |
| 2012/0203980 A1* | 8/2012 | Flynn et al. ................... 711/154 |

FOREIGN PATENT DOCUMENTS

| | | |
|---|---|---|
| WO | 94/02898 | 2/1994 |
| WO | 2005/093580 | 10/2005 |

* cited by examiner

*Primary Examiner* — John Lane
(74) *Attorney, Agent, or Firm* — Allen, Dyer, Doppelt, Milbrath & Gilchrist, P.A.

(57) ABSTRACT

A method may defrag a memory for an IC card having a plurality of files stored in memory portions, each file including respective links to one or more other files. The method may include detecting a start address of a first free memory portion of the memory, detecting an address of a memory portion following the start address and storing one file to be moved, detecting files including links to the address of the file to be moved, moving the file to be moved to the start address of the first free memory portion, updating the links to point at the start address, and repeating the above steps until at least two free memory portions following the moved files are separated by one or more of files.

26 Claims, 5 Drawing Sheets

METHOD TO DEFRAG A MEMORY OF AN IC CARD

FIELD OF THE INVENTION

The present disclosure relates to a method to defrag a memory of an integrated circuit (IC) card comprising a plurality of files stored in memory portions, each file including respective links to one or more other files, and to a related IC card.

BACKGROUND OF THE INVENTION

A method for defragging a memory of an IC card, the IC card comprising a plurality of files stored in memory portions and including respective links to one or more other files, may compact free memory portions deriving from a release of the memory portions when the corresponding files are deleted or moved. More particularly, a fragmentation of the memory occurs when the IC card operating system does not allocate enough contiguous free memory portions to store a file as a unit but instead puts parts of the file in gaps, i.e. in free memory portions between other files. Fragmentation also occurs when such gaps or free memory portions are too small to store files.

A known method to defrag a memory may include moving into a swap area a plurality of files which cause fragmentation of memory, releasing the corresponding memory portions, compacting them with neighboring free memory portions, and finally copying the files from the swap area in contiguous memory portions of the memory.

A drawback of this method may be that it involves too many IC card resources because it uses a swap area for temporary storage of the files and several writing operations from the memory portions into the swap are and vice versa, thus involving too much time, memory space, and processing resources to defragment the memory. Moreover, the method may recalculate the links from the files of the memory portions not involved in the defragmentation towards the moved files, as well as the links between the moved files themselves and from the moved files to the files not involved in the defragmentation.

This drawback is apparent when the memory of the IC card uses a tree structure file system including a master file MF or root node, and a plurality of children nodes, also indicated as directory nodes DF, elementary files EF and local object LO. More particularly, the master file MF links every children node, i.e. directory nodes DF and/or elementary files EF and/or local object LO, and each directory node DF may link further children nodes, i.e. further directory nodes DF and/or elementary files EF and/or local object LO. Thus, when the method moves children nodes from the respective memory portions to the swap area and when it moves back such children nodes from the swap area to the memory portions, it may recalculate all the links from the respective parent nodes and to children nodes.

SUMMARY OF THE INVENTION

The problem at the base of the present disclosure may be to provide a method to defrag a memory for an IC card comprising a plurality of files stored and linked together, to avoid storing the files to be moved in a swap area and reducing a number of writing operations used, and to restore the links to the new addresses of the moved file.

The approach of the present disclosure may include identifying a predetermined free memory portion of a memory to be defragged, shifting a file stored in a memory portion following the free memory portion into the identified memory portion, and releasing the memory portion previously occupied by the file so that the released memory portion may be merged with a contiguous free memory portion, thus reducing a number or free memory portions and increasing their size. The above steps may be repeated after the file has been moved, identifying the first free memory portion following the moved file. Advantageously, if the file moved was stored between two subsequent free memory portions, a size of the first free memory portion following the moved file may be greater than a size of the first free memory portion previously identified.

According to the approach, a method may defrag a memory for an IC card comprising a plurality of files stored in memory portions, each file including respective links to one or more other files. The method may include detecting a start address of a first free memory portion of the memory, detecting an address of a memory portion following the start address and storing one file to be moved, detecting files including links to the address of the file to be moved, moving the file to be moved at the start address of the first free memory portion, updating the links to point at the start address, and repeating the above steps while at least two free memory portions following the moved file are separated by one or more other files.

Advantageously, the method may defrag the memory simply moving one file or more contiguous files at the start address of the free memory portion and consequently shifting such free memory portion after the moved files, i.e. towards a following free memory portion. The free memory portions may include a start address of the respective free memory portion, a corresponding size, and a link to a following free memory portion, the start address, size and links being updated after the step of moving the file to be moved.

Advantageously, according to the method, only the start address, the size, and the links of two subsequent free memory portions may be stored and updated, thus reducing the processing resources of the IC card. If the file to be moved is included between the first free memory portion and a subsequent free memory portion, the step of updating the start address, the size, and the link may comprise merging the first and the subsequent free memory portions in a resulting free memory portion having a size equal to the sum of the sizes of the first and the subsequent memory portions, a link equal to the link of the subsequent free memory portion, and a start address shifted of a number of bytes corresponding to a size of the moved file. If the file to be moved is included between the first free memory portion and one of the files, the step of updating the start address, the size, and the links may comprise shifting the start address of the first memory portion of a number of bytes corresponding to a size of the moved file.

An IC card may include a memory with a plurality of files stored in memory portions, each file including respective links to one or more other files and including means or a processor for executing the step of the above mentioned method to defrag. Advantageously, the method of the present disclosure may not use a swap area to move the files of the memory because it reiterates the step of shifting one file towards a first free memory portion, substantially corresponding to an shift in opposite direction of such free memory portion and to a merging of such first free memory portions with a following free memory portion. Advantageously, the method may involve few processing resources of the IC card because it simply stores in a linked list data concerning the first two free memory portions, i.e. the respective start address, a size, and a pointer to the following free memory portion and detects, step by step, the address of a memory portion storing a file to be moved.

Further advantages according to the method of the present disclosure may be apparent from the description given below with exemplificative purpose and without limiting the scope of protection of the disclosure.

DETAILED DESCRIPTION OF THE PREFERRED EMBODIMENTS

Figure 1A:
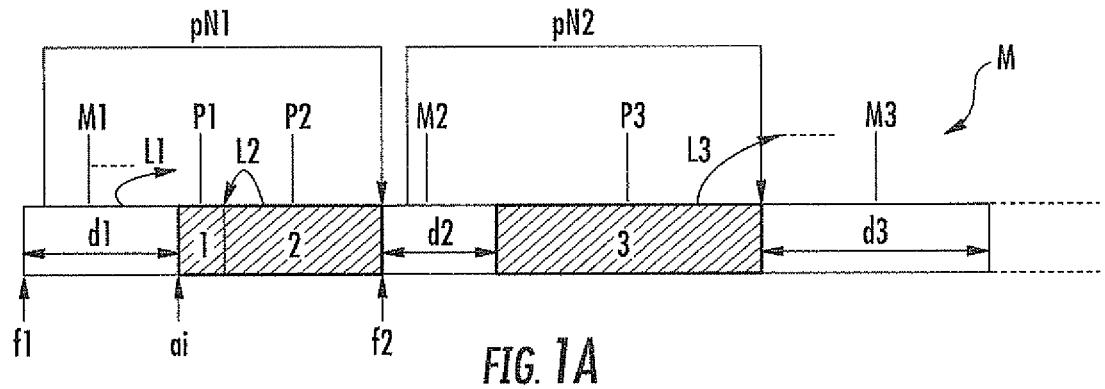
FIGS. 1a-1c schematically represent the steps of the method to defrag a memory for an IC card including files linked together, according to the present disclosure.
Figure 1B:
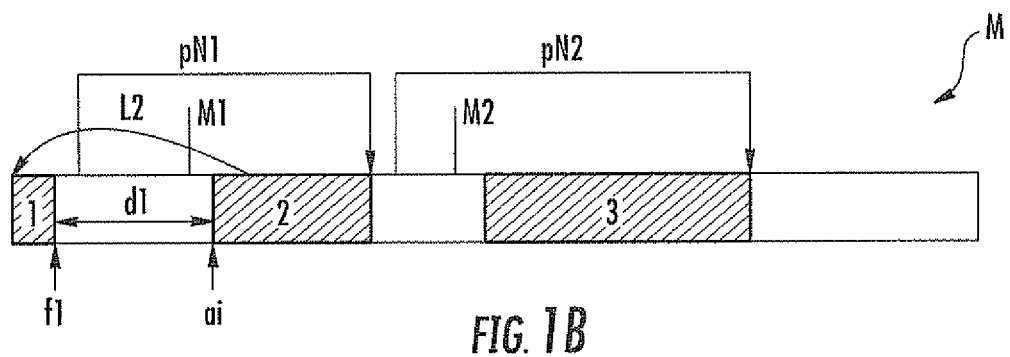
Figure 1C:
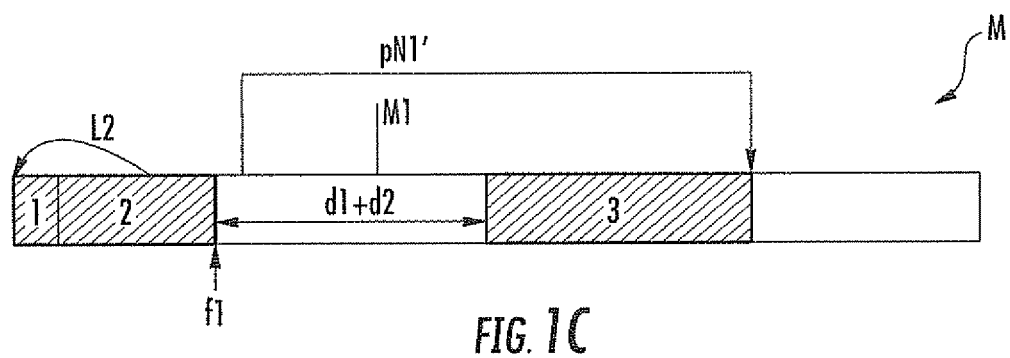

With reference to FIGS. 1a-1c, the main steps of a method to defrag a memory M of an IC card according to the present disclosure are schematically represented, the memory M comprising a plurality of files 1, 2, 3 stored in corresponding memory portions P1, P2, P3 and including respective links L1, L2, L3 to one or more other files 1, 2, 3. The memory M of FIG. 1a is fragmented because it comprises free memory portions M1, M2, M3, which are not contiguous and separated by memory portions P1, P2, P3 storing the files 1, 2, 3. More particularly, with reference to FIG. 1a, a first free memory portion M1 of size d1 is separated from a second free memory portion M2 of size d2 by files 1, 2 and the second free memory portion M2 is separated from a third free memory portion M3 of size d3 by a file 3.

The memory M in FIG. 1a-1c is represented as a sequence of consecutive blocks M1-M3, P1-P3 including the free memory portions M1, M2, M3 and the memory portions P1, P2, P3. The files 1, 2, 3 are linked together with respective links L1, L2, L3, for example, a link L2 from file 2 to file 1 and links L1, L3, respectively from files 1, 3 to other files of the memory M, which are not represented.

According to the method of the present disclosure, a start address f1 of the first free memory portion M1, which is represented in FIG. 1a as the leftmost block, is detected. Of course, the block corresponding to the first free memory portion may be at any predetermined address of the memory M which is defined as start address to begin the defrag of the memory M.

An address ai of the memory portion P1 following the start address f1 and storing one file 1 is further detected. The detected file 1 is the first file to be moved from the corresponding memory portion P1 to the first free memory portion M1, substantially shifting the respective block at the start address f1. More particularly, before shifting the file 1, the file(s) 2 of the memory M including links L2 to the file to be moved 1 are detected, i.e. the links L2 to the address ai of such file to be moved 1.

The file to be moved 1 is moved at the start address f1 of the first free memory portion M1, and the links L2 of the files pointing to it are updated, in order to point at the start address f1, i.e. to the new address of the moved file 1. The result of the steps above indicated is schematically represented in FIG. 1b, wherein the memory portion P1 of file 1 is shifted left and the first free memory portions M1 is consequently shifted right a number of bytes corresponding to a byte size of the shifted memory portion P1.

The steps above described are repeated until at least two free memory portions M1, M2 following the already moved file 1 are separated by one or more files 2, 3. More particularly, after the first file 1 has been moved and, the method detects the first free memory portion M1 following the moved file 1 and updates the start address f1 of such first free memory portion M1 and the address ai of the file 2 to be moved and following the updated first free memory portion M1.

With reference to FIG. 1b, the start address f1 of the first free memory portion M1 following the already moved file 1, is the start address f1 to the right of such file 1 and the address ai of the memory portion P2 following the start address f1 and storing one file 2 to be moved 1 is the address ai. As already explained for file 1, the links to the address ai of the file to be moved 2 are detected, file 2 is shifted at the start address f1 of the first free memory portion M1, and the links are updated to point at the start address f1, i.e. the new address of file 2. The result of this step comprising the shifting of file 2 is represented in FIG. 1c.

As it is apparent in this figure, when file 2 is shifted left, i.e. at the start address f1, the first free memory M1 is correspondingly shifted to the right for the number of bytes equal to the byte size of the memory portion P2. In this case, since the first free memory M1 and the following free memory portion M2 of FIG. 1b were only separated by the file 2 to be moved, the right size shift result in a merge, i.e. in a defragmentation, of the first free memory M1 and the following free memory portion M2.

Again with reference to FIG. 1a, is here below described in more detail the execution of the method of the disclosure. The free memory portions M1, M2 of FIG. 1a include start addresses f1, f2 of the respective free memory portions M1, M2, corresponding sizes d1, d2, and links pN1, pN2 to a following free memory portion, i.e. to the memory portions M2 and M3. In other words, the free memory portions are implemented as a linked list wherein each list entry comprises the respective start address, the size, and the link to the following list entry.

The start addresses f1, f2, the sizes d1, d2, and the links pN1, pN2 are updated after the step of moving the file to be moved 1 at the start address f1. More particularly, if the file to be moved 2 is included between the first free memory portion M1 and the subsequent free memory portion M2, as represented in FIG. 1b, the step of updating the start address f1, f2, the sizes d1, d2, and the links pN1, pN2 comprises merging the first and the subsequent free memory portions M1, M2 in a resulting free memory portion M1, which is represented in FIG. 1c and comprises size d1+d2 equal to the sum of the sizes d1, d2 of the first and the subsequent memory portions M1, M2 of FIG. 1b; link pN1 equal to the link pN2 of the subsequent free memory portion M2; and start address f1 shifted with respect to the start address f1 of the first free memory portion of a number of bytes corresponding to a byte size lj of the moved file 2.

On the contrary, if the file to be moved 1 is included between the first free memory portion M1 and one file 2, 3, as represented in FIG. 1a, the step of updating the start address f1, f2, size d1, d2 and links pN1, pN2 comprises only shifting the start address f1 of a number of bytes corresponding to a size lj of the moved file 1. According to the method of the disclosure, the files to be moved 1, 2 are moved at the start address f1 in blocks having the size d1 of the corresponding first free memory portion M1. Advantageously, copying the file in small block avoids damaging of files 1, 2, 3 if a failure, for example, a power loss, occurs during the defrag method execution.

In an aspect of the present disclosure, the files 1, 2, 3 are linked in a tree file system having one file 1 as root node MF and a plurality files 2, 3 as children nodes DF, EF, LO, the children nodes DF, EF, LO being linked to the root node MF. More particularly, the children nodes DF may be linked to further children nodes DF, EF, LO as represented in FIGS. 2-5.

The above step of detecting files 2 including links L2 to address ai comprises detecting the children node DF, EF, LO corresponding to the file to be moved 1 and detecting the corresponding parent node and children nodes DF, EF, LO while the step of updating the links L1 L2, L3 comprises pointing the links from the parent node and the links from the children nodes DF, EF, LO to the start address f1 of the moved file 1. Here below is given, without limiting the scope of protection of the present disclosure, an embodiment of the method to defrag a memory of an IC card including DF or Dedicated File, EF or Elementary File, LO or Local Object and a MF or Master File. More particularly, in the following description, nf indicates a number of free memory portions and na a number of memory portions storing files.

The free memory portions are linked in a linked list including list entries of the type (fi, di, pNi) with $1 \leq i \leq nf$ where fi is the address of the free memory portion, di is the corresponding length and pNi is the link to the next memory portion in the linked list, i.e. pNi=fi+1 with $1 \leq i < nf$ and pNnf=Null, wherein Null is a pointer for no links. If nf=1, the defrag process is completed or not required, i.e. the memory is already defragged. Each memory portion storing files corresponds to a couples of values aj, lj with $1 \leq j \leq na$, aj the address of the allocated block and lj its length. More particularly, each couple aj, lj represents the start address aj and the length lj of an EF, DF, LO children node or MF in the file system tree. Aj, lj and aj+1, lj+1 precede as header portions the corresponding data, which are represented in FIG. 6 as continue lines; thus, data of the allocated block does not store links or structural information which are stored in the corresponding header portions.

Figure 6:
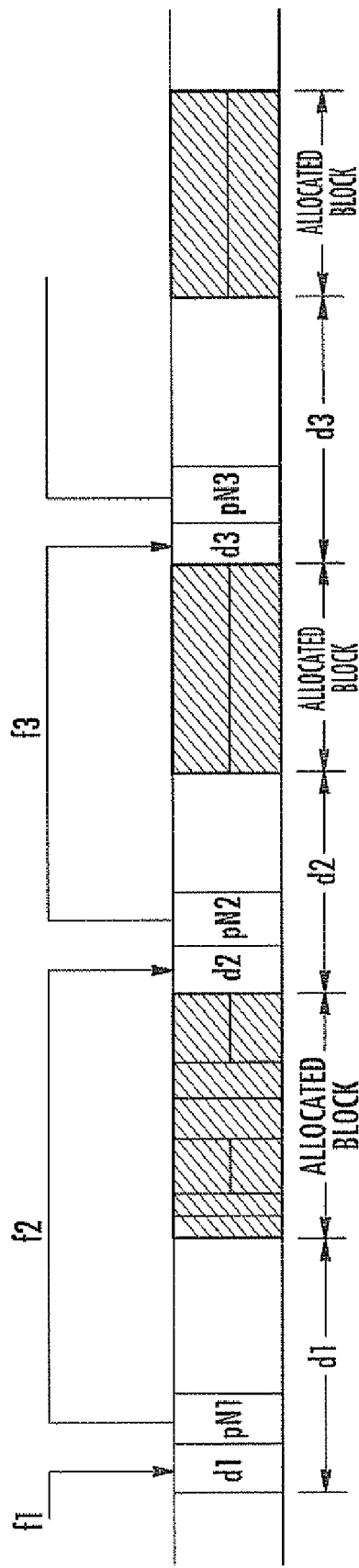
FIG. 6 schematically represents in more detail the memory of FIG. 1.

With reference to FIG. 6, the method substantially process a vector of values "fi, di, pNi, di+1, pNi+1, aj, lj, S, C" to move the memory portion starting at address aj=fi+di, of length lj, at address fi. S is a state of the defrag method and may correspond to: S0=Start defrag, S1=Defrag Operation Stored, S2=memory portion aj, lj moved, S2I=Intermediate state, S3=free memory portions updated, S4=link Updated, AND S5=Stop.

For example, in state S1 the following defrag operation or vector is stored: f1, d1, pN1, d2, pN2, aj, lj, S, C=0 where aj, lj is the first memory portion such that aj>f1. C is a byte counter with start value 0. If an unexpected interruption occurs during defrag, the status S and the counter C may be used to resume it from the point in which it has been interrupted.

Figure 7:
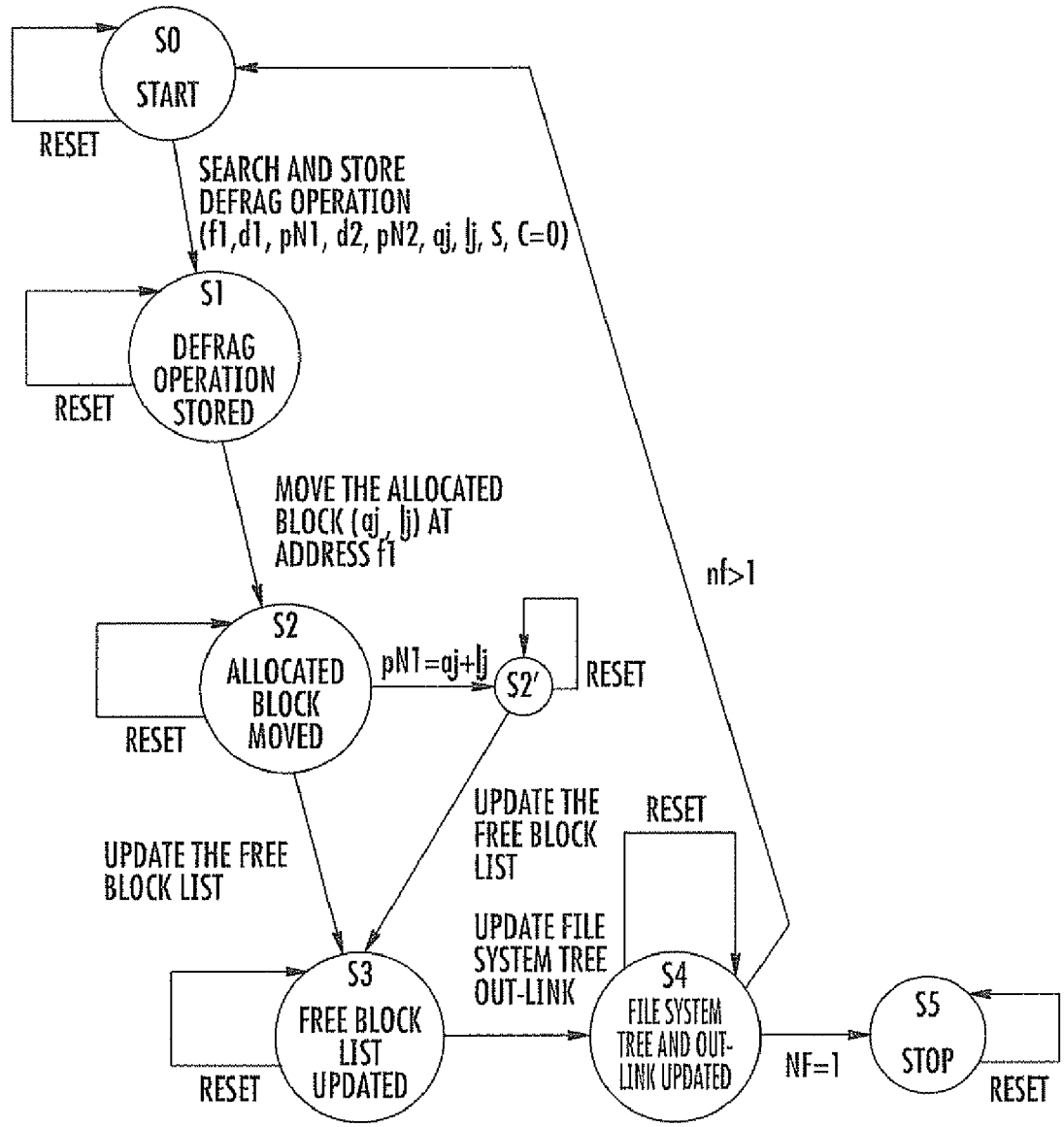
FIG. 7 schematically represents in a flow diagram the steps of the method according to the present disclosure.

With reference to FIG. 7, the method may execute the following steps: checking the number of free memory portions nf; if nf$\leq$1, update the state to S5 and terminate; starting from the first two free memory portions, storing the defrag operation f1, d1, pN1, d2, pN2, aj, lj, S=S0, C=0; updating from state S0 to state S1; moving the memory portion aj, lj at start address f1; updating from state S1 to state S2; decreasing the number of free memory portions, i.e. nf=nf−1, and updating from state S2 to state S2I, if pN1=aj+lj; updating the free block list; updating from state S2 or S2I to state S3; updating the file system finding the LO, EF, DF with links pointing to aj and updating them to point to f1; updating from state S3 to state S4; updating to state S5, if nf=1; and updating to state S0 and re-executing step 2, if nf>1. Advantageously, the number of reiteration of the method is upper limited by the number of files EF, DF, LO, MF allocated in the file system.

In order to avoid loss of data in case of asynchronous system resets, the step 4 of moving the memory portion aj, lj at start address f1 is executed moving the memory portion aj in block of size equal to the size of the free memory portion. After each piece of size d1 is moved, the counter C is incremented and stored in the vector f1, d1, pN1, d2, pN2, aj, lj, S=S1, C=0. In case of asynchronous system reset the procedure is executed from beginning.

Figure 2:
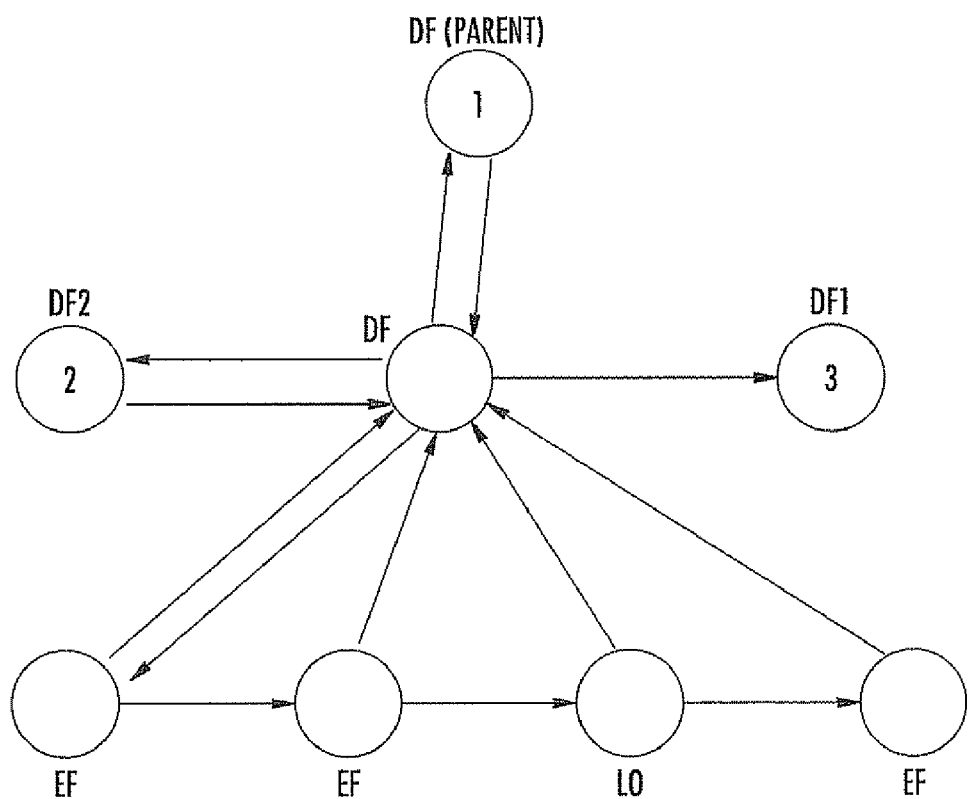
FIG. 2 schematically represents the files of FIG. 1 linked in a first tree structure.

In the following description and with reference to FIGS. 2-5, further details are given for the step 9 concerning file system update. With reference to FIG. 2 the memory portion aj, lj to be moved is the node DF, which is the first child of its DF parent. In this case, the links may be updated according to the following pseudo code.

Figure 3:
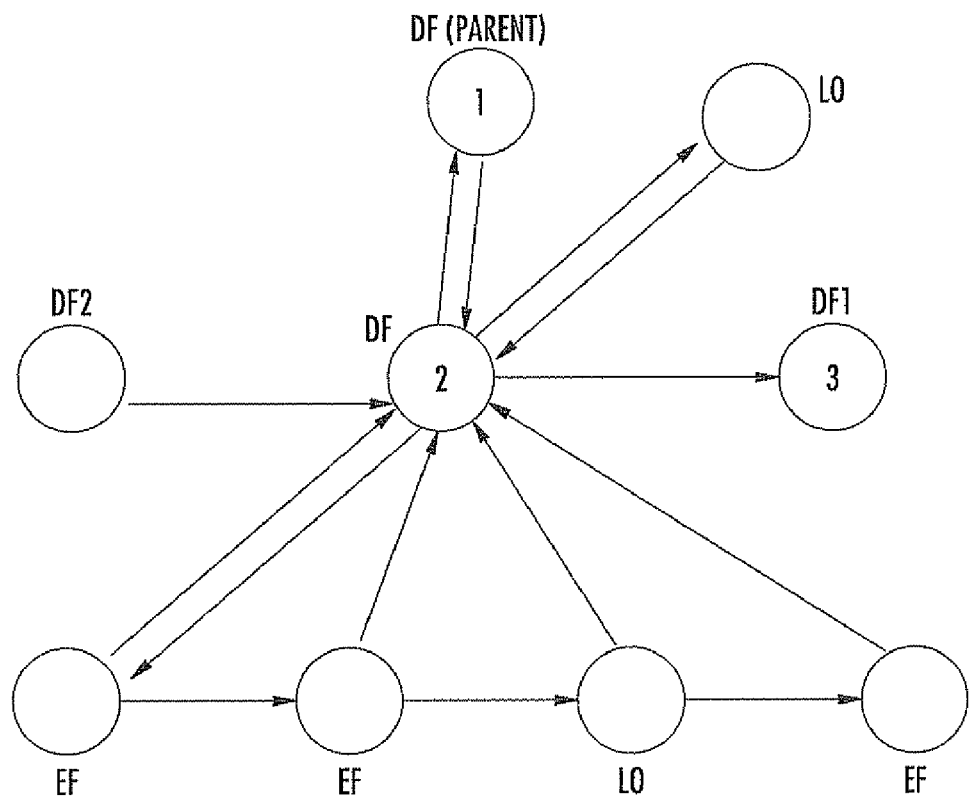
FIG. 3 schematically represents the files of FIG. 1 linked in a second tree structure.

Children(Parent(f1))=f1, wherein f1 is the new address of DF, Parent(f1) relates to DF(parent) and Children(Parent(f1)) is the link from DF(parent) to DF; thus Children(Parent(f1))=f1 provides updating the link from DF(parent) to the new address f1 of DF. Similarly, the following pseudo code represents the updating of the EF children of DF:

EF=Children(f1)
While (EF≠NULL) do
If (Parent (EF)≠f1) Then Parent (EF)=f1
EF=Brother(EF)
End While and the following pseudo code represents the updating of the LO children of DF:

LO=LocalObject(f1)
While (LO≠NULL) do
If (Parent(LO)≠f1) Then Parent (LO)=f1
LO=Brother(LO)
End While With reference to FIG. 3 the memory portion aj, lj to be moved is the node DF which is not the first children of its DF parent. The pseudo code representing the update of the links from the brothers of DF is:

B=Children(Parent(f1))
While (Brother(B)≠aj) AND (Brother(B)≠NULL) do
B=Brother (B)
End While
If (Brother(B)=aj) Then Brother(B)=f1

Figure 4:
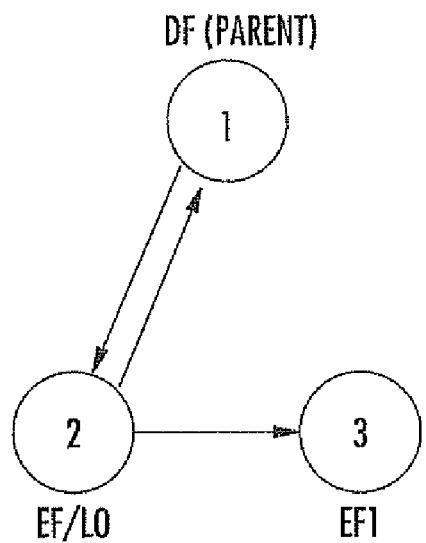
FIG. 4 schematically represents the files of FIG. 1 linked in a third tree structure.

Similarly, the update of the list of EF children of DF is provided by:

EF=Children(f1)
While (EF≠NULL) do
If (Parent (EF)≠f1) Then Parent (EF)=f1
EF=Brother(EF)
End While and the update of the list of LO by:

LO=LocalObject(f1)
While (LO≠NULL) do
If (Parent (LO)≠f1) Then Parent (LO)=f1
LO=Brother (LO)
End While With reference to FIG. 4, the memory portion aj, lj to be moved is the node EF or LO which is the first children of its DF parent. In this case, the pseudo code corresponding to the update of the link from the DF parent is:

Children(Parent(f1))=f1

Figure 5:
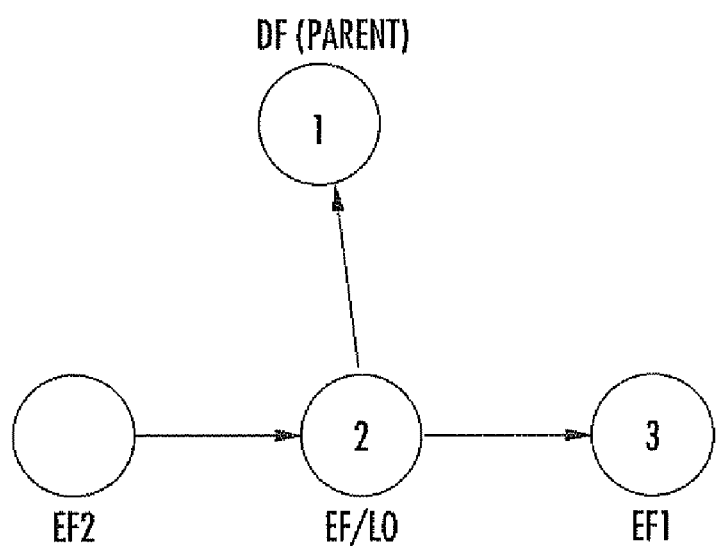
FIG. 5 schematically represents the files of FIG. 1 linked in a fourth tree structure.

Finally, with reference to FIG. 5, the memory portion aj, lj to be moved is the node EF or LO which is not the first children of its DF parent. In this case, the pseudo code corresponding to the update of the link from the EF or LO brother is:

B=Children(Parent(f1))
While (Brother(B)≠aj) AND (Brother(B)≠NULL) do
B=Brother (B)
End While
If (Brother(B)=aj) Then Brother(B)=f1

Hereinbelow are some advantages of the method to defrag according to the present disclosure: the size of memory used to defrag is reduced because only the memory space to store the vector f1, d1, pN1, d2, pN2, aj, lj, S, C is used; the number of operations used to defrag the memory is reduced and upper limited by the number of files EF, DF, LO, MF stored in the file system; and the status of the method to defrag may be recovered after a fault.

Advantageously, the method of the present disclosure does not require a swap area to move the files of the memory M because it reiterates the step of shifting one file towards a first free memory portion, substantially corresponding to an shift in opposite direction of such free memory portion and to the merging of such first free memory portions with a following free memory portions.

Advantageously, the method may involve few processing resources of the IC card because it simply stores in a linked list data concerning the first two free memory portions, i.e. the respective start address, size and pointer to the following free memory portion and detect, step by step, the address of a memory portion storing a file to be moved.

That which is claimed is:

1. A method to defragment a memory for an integrated circuit (IC) card comprising a plurality of files stored in memory portions, each file including a link to at least one other file, the method comprising:
   detecting a start address of a first free memory portion of the memory;
   detecting an address of a memory portion following the start address, the memory portion storing a file to be moved;
   detecting files including links to the address of the file to be moved;
   moving the file to be moved to the start address of the first free memory portion; and
   updating the links to point to the start address.

2. The method according to claim 1 further comprising repeating the detecting of the start address, detecting the address of the memory portion following the start address, detecting the files, moving the file, and updating links while at least two free memory portions following the moved file are separated by at least one other file.

3. The method according to claim 2 wherein each of the at least two free memory portions includes a start address, a corresponding size, and a link to a following free memory portion; and wherein the start address, the size, and the link to the following free memory portion are updated after the file has been moved.

4. The method according to claim 3 wherein if the file to be moved is included between a first free memory portion and a subsequent free memory portion from the at least two free memory portions, the updating of the start address, the size, and the link to the following free memory portion comprises merging the first and the subsequent free memory portions into a resulting free memory portion having an updated size equal to a sum of the sizes of the first and the subsequent memory portions, an updated link equal to the link of the subsequent free memory portion, and an updated start address shifted with respect to the start address a number of bytes corresponding to a size of the moved file.

5. The method according to claim 3 wherein if the file to be moved is included between the first free memory portion and one of the other files, the updating of the start address, the size, and the link to the following free memory portion comprises shifting the start address of the first memory portion a number of bytes corresponding to a size of the moved file.

6. The method according to claim 5 wherein the file to be moved is moved to the start address in blocks having the size of the first free memory portion.

7. The method according to claim 2 wherein the files are linked in a tree file system having a file as root node and a plurality files as children nodes, the children nodes being linked to the root node.

8. The method according to claim 7 wherein the children nodes are linked to additional children nodes.

9. The method according to claim 8 wherein the detecting of the files including links to the address comprises detecting the child node corresponding to the file to be moved, and detecting the corresponding parent node and children nodes; and wherein the updating of the links comprises pointing the links from the parent node and the links from the children nodes to the start address of the moved file.

10. The method according to claim 1 wherein the memory for the IC card comprises semiconductor memory.

11. A method to defragment a memory for an integrated circuit (IC) card comprising a plurality of files stored in memory portions, each file including a link to at least one other file, the files being linked together in a tree file system having a file as root node and a plurality files as children nodes, the children nodes being linked to the root node, the method comprising:
   detecting a start address of a first free memory portion of the memory;
   detecting an address of a memory portion following the start address, the memory portion storing a file to be moved;
   detecting files including links to the address of the file to be moved;
   moving the file to be moved to the start address of the first free memory portion;
   updating the links to point to the start address; and
   repeating the detecting of the start address, detecting the address of the memory portion following the start address, detecting the files, moving the file, and updating the links while at least two free memory portions following the moved file are separated by at least one other file, each of the at least two free memory portions including a start address, a size, and a link to a following free memory portion, the start address, the size, and the link to the following free memory portion being updated after the file has been moved.

12. The method according to claim 11 wherein if the file to be moved is included between a first free memory portion and a subsequent free memory portion from the at least two free memory portions, the updating of the start address, the size, and the link to the following free memory portion comprises merging the first and the subsequent free memory portions into a resulting free memory portion having an updated size equal to a sum of the sizes of the first and the subsequent memory portions, an updated link equal to the link of the subsequent free memory portion, and an updated start address shifted with respect to the start address a number of bytes corresponding to a size of the moved file.

13. The method according to claim 11 wherein if the file to be moved is included between the first free memory portion and one of the other files, the updating of the start address, the size, and the link to the following free memory portion comprises shifting the start address of the first memory portion a number of bytes corresponding to a size of the moved file.

14. The method according to claim 13 wherein the file to be moved is moved to the start address in blocks having the size of the first free memory portion.

15. The method according to claim 11 wherein the children nodes are linked to additional children nodes.

16. The method according to claim 15 wherein the detecting of the files including links to the address comprises detecting the child node corresponding to the file to be moved, and detecting the corresponding parent node and children nodes; and wherein the updating of the links comprises pointing the links from the parent node and the links from the children nodes to the start address of the moved file.

17. An integrated circuit (IC) card comprising:
a memory configured to store a plurality of files in memory portions, each file including respective links to at least one other file; and
a processor configured to
detect a start address of a first free memory portion of the memory,
detect an address of a memory portion following the start address, the memory portion storing a file to be moved,
detect files including links to the address of the file to be moved,
move the file to be moved to the start address of the first free memory portion, and
update the links to point to the start address.

18. The method according to claim 17 wherein said processor is configured to repeat the detecting of the start address, detecting the address of the memory portion following the start address, detecting the files, moving the file, and updating the links while at least two free memory portions following the moved file are separated by at least one other file.

19. The IC card according to claim 18 wherein each of the at least two free memory portions includes a start address, a corresponding size, and a link to a following free memory portion; and wherein said processor is configured to update the start address, the size, and the link to the following free memory portion after the file has been moved.

20. The IC card according to claim 19 wherein if the file to be moved is included between a first free memory portion and a subsequent free memory portion from the at least two free memory portions, the updating of the start address, the size, and the link to the following free memory portion comprises merging the first and the subsequent free memory portions into a resulting free memory portion having an updated size equal to a sum of the sizes of the first and the subsequent memory portions, an updated link equal to the link of the subsequent free memory portion, and an updated start address shifted with respect to the start address a number of bytes corresponding to a size of the moved file.

21. The IC card according to claim 19 wherein if the file to be moved is included between the first free memory portion and one of the other files, the updating of the start address, the size, and the link to the following free memory portion comprises shifting the start address of the first memory portion a number of bytes corresponding to a size of the moved file.

22. The IC card according to claim 21 wherein the file to be moved is moved to the start address in blocks having the size of the first free memory portion.

23. The IC card according to claim 18 wherein the files are linked in a tree file system having one file as root node and a plurality files as children nodes, the children nodes being linked to the root node.

24. The IC card according to claim 23 wherein the children nodes are linked to additional children nodes.

25. The IC card according to claim 24 wherein the detecting of the files including links to the address comprises detecting the child node corresponding to the file to be moved, and detecting the corresponding parent node and children nodes; and wherein the updating of the links comprises pointing the links from the parent node and the links from the children nodes to the start address of the moved file.

26. The IC card according to claim 17 wherein said memory comprises semiconductor memory.

* * * * *